United States Patent
Ikeda et al.

(10) Patent No.: US 8,032,775 B2
(45) Date of Patent: Oct. 4, 2011

(54) STORAGE SYSTEM

(75) Inventors: Hirokazu Ikeda, Yamato (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 12/153,690

(22) Filed: May 22, 2008

(65) Prior Publication Data
US 2009/0249104 A1    Oct. 1, 2009

(30) Foreign Application Priority Data
Mar. 28, 2008    (JP) ................................. 2008-086672

(51) Int. Cl.
*G06F 1/00*    (2006.01)
(52) U.S. Cl. ....................................................... 713/324
(58) Field of Classification Search ........... 713/300–340
See application file for complete search history.

(56) References Cited

U.S. PATENT DOCUMENTS

| | | | |
|---|---|---|---|
| 5,423,046 A * | 6/1995 | Nunnelley et al. | 713/330 |
| 5,734,912 A * | 3/1998 | Okuno et al. | 713/310 |
| 6,012,124 A * | 1/2000 | Kamo et al. | 711/114 |
| 7,007,183 B2 * | 2/2006 | Rawson, III | 713/324 |
| 7,035,972 B2 * | 4/2006 | Guha et al. | 711/114 |
| 7,370,220 B1 * | 5/2008 | Nguyen et al. | 713/330 |
| 7,472,298 B1 * | 12/2008 | Kimmel et al. | 713/320 |
| 7,516,348 B1 * | 4/2009 | Ofer | 713/324 |
| 2006/0193073 A1 | 8/2006 | Hakamata et al. | |
| 2007/0250723 A1 * | 10/2007 | Shima et al. | 713/300 |

FOREIGN PATENT DOCUMENTS
JP    2000-293314    4/1999
* cited by examiner

*Primary Examiner* — Paul Myers
(74) *Attorney, Agent, or Firm* — Stites & Harbison PLLC; Juan Carlos A. Marquez, Esq.

(57) ABSTRACT

A journal volume is created in a different power control unit of a normal mode, and the power saving mode is maintained by storing differential data in the journal until the corresponding power control unit is returned to a normal mode. A replication pair in a pair status in the power control unit is confirmed, set as a target to be switched to the power saving mode if it is of a constant value or less, and a management server is notified if there is an operation for creating a volume.

17 Claims, 18 Drawing Sheets

| POWER CONTROL UNIT | PAIR STATUS S-VOL COUNT | SUSPEND STATUS S-VOL COUNT | PRIORITY | WAITING TIME |
|---|---|---|---|---|
| 001 | 92 | 164 | Low | 32:49 |
| 002 | 43 | 213 | High | 12:02 |
| ... | ... | ... | ... | ... |
| 109 | 78 | 178 | Middle | 18:11 |

| POWER CONTROL UNIT | TASK ID | TASK TYPE | REPLICATION PAIR | P-VOL | S-VOL | JNL-VOL |
|---|---|---|---|---|---|---|
| 001 | 0013 | Resync | Pair002 | | 00:a1:56 | 00:b3:02 |
| 001 | 0015 | DELETE S-VOL | Pair012 | | 00:a2:f7 | |
| ... | ... | ... | ... | ... | ... | ... |
| 002 | 0276 | CREATE S-VOL | (Pair015) | 00:c4:60 | (00:a3:44) | 00:ba:63 |
| 002 | 0277 | Split | Pair016 | 00:d0:f1 | 00a4:21 | 00:bb:c5 |
| ... | ... | ... | ... | ... | ... | ... |

| POWER CONTROL UNIT 4201 | JNL VOL REMAINING CAPACITY 4202 | JNL-VOL I/O 4203 | EXECUTION WAITING TASK COUNT 4204 | POWER SAVING MODE DURATION 4205 | MONITORING PERIOD 4206 |
|---|---|---|---|---|---|
| 001 | 25% | 0.6Mbps | 13 | 105:34:10 | 125:53:22 |
| 002 | 46% | 0.1Mbps | 9 | 43:21:55 | 125:53:22 |
| ... | ... | ... | ... | ... | ... |
| 109 | 67% | 0.2Mbps | 4 | 11:02:59 | 125:53:22 |

STORAGE SYSTEM

CROSS-REFERENCES

This application relates to and claims priority from Japanese Patent Application No. 2008-086672, filed on Mar. 28, 2008, the entire disclosure of which is incorporated herein by reference.

BACKGROUND

The present invention generally relates to a storage system, and in particular can be suitably applied to a storage system that performs power saving control.

Pursuant to the diffusion of computers, the amount of data that is being handled is increasing year by year. A storage apparatus is an apparatus that safely and efficiently retains massive data, is connected to a computer via a communication line, and provides a volume (container of data). For companies that handle vast amounts of data, a storage apparatus is an infrastructure that is essential for business continuation, and volumes and data being destroyed and becoming unavailable due to unexpected accidents or disasters, or computer viruses or application errors could have a grave impact on business.

Thus, a replication control function provided by the storage apparatus is normally used for creating a replication or backup of data. As the replication control function, there is a type that synchronizes data from a primary volume (P-VOL) to a secondary volume (S-VOL) in volume units, and a type that stores only the updated differential information of the primary volume as journal data in a journal volume (JNL VOL). Although the latter requires a small volume capacity, since the primary volume cannot be restored if it becomes unavailable, it is unfit for failure recovery. A pair configured from a primary volume and a secondary volume is referred to as a replication pair, and the replication pair has a Pair status of constantly synchronizing the data and a Suspend status that does not synchronize the data. Moreover, it is possible to use the replication control function and change the status of the replication pair from a Pair status to a Suspend status (Split), or the reverse thereof (Resync).

In addition, data centers that generally consume vast amounts of electricity are facing a significant problem of power consumption pursuant to the recent enlargement and high densification of data centers. Storage apparatuses play a big part in this problem, and technology for reducing the power consumption of storage apparatuses is attracting attention. MAID (Massive Arrays of Inactive Disks) is technology for suppressing power consumption by controlling or stopping the rotation of the magnetic disk in a hard disk, and this is being applied primarily to corporate storage apparatuses.

Japanese Patent Laid-Open Publication No. 2000-293314 describes power saving technology of changing a magnetic disk, which is not accessed from a host system such as a host for a given period of time, to a power saving mode, or turning off the power, and the MAID technology can be used for the power control of magnetic disks. As a unit for controlling power consumption, in addition to magnetic disks, there are various units in the relationship with the power supply such as an array group, a physical disk provision unit, and a rack blade, but this unit is generally referred to as a power control unit in this specification. As a result of using this kind of power saving technology, the power consumption of physical disks stored in the storage apparatus can be reduced. In reality, since data is stored in RAID Group units, a RAID Group will become the smallest unit as the basic power control unit.

SUMMARY

When configuring a pair with the P-VOL and the S-VOL, the P-VOL cannot be set to a power saving mode since it is used in regular business activities, and since the I/O (Input/Output) of the backed up S-VOL is normally blocked, it is desirable that such S-VOL is placed in a separate power control unit from the P-VOL, and operated in a power saving mode (including power off).

Nevertheless, when executing Resync to the S-VOL in a power saving mode for synchronization or when creating the S-VOL in a power boundary in a power saving mode, it is necessary to return to a normal mode, but this will generate loss of power during the period of returning to the power saving mode once again. If the ratio of S-VOL of a Suspend status in the power boundary is of a constant value or greater, it is effective to promptly switch to the power saving mode, but it is difficult to appropriately determine this and perform operations.

The present invention was devised in view of the foregoing points. Thus, an object of the present invention is to propose a storage system capable of realizing efficient power consumption reduction while maintaining the power saving mode for a long period of time.

In order to achieve the foregoing object, the present invention provides a storage system including a storage apparatus system connected to a host via a communication path. This storage system comprises a power control unit stored in the storage apparatus system and which is a unit for controlling the power supply to constituent components of the storage apparatus system, a power control module for switching a normal mode of performing normal power supply and a power saving mode of suppressing power consumption for each power control unit, a physical volume to which power is supplied with the power control unit and which becomes unavailable in the power saving mode, a logical volume created by combining or partitioning the physical volume, and a power control monitoring module for acquiring configuration information of the physical volume and the logical volume and the power control unit and determining the availability using the configuration information upon allocating a logical volume in the power control unit.

The present invention also provides a storage system that continues the power saving mode by making the synchronous operation to the S-VOL in a power saving mode appear to be completed by creating a JNL VOL in a separate power control unit in a normal mode and storing differential data therein.

The present invention also provides a storage system that coercively moves a power boundary that is mainly used for secondary uses to the power saving mode by blocking the I/O of the S-VOL in a pair status, creating a JNL VOL in a separate power boundary in a normal mode, and storing differential data therein.

Moreover, in the change availability determination, the configuration and status of the pair are checked and, when it is determined that there are many S-VOL in a Suspend status, the host is notified not to create a volume in the power control unit.

According to the present invention, by performing the operation to a power source boundary of a power saving mode in the storage system asynchronously after returning to a normal mode, it is possible to realize efficient power consumption reduction while maintaining the power saving mode for a long period of time.

Further, even if data is written from the P-VOL into the power source control unit it is possible to switch to the power saving mode by using another power source boundary.

In addition, it is easier to switch to the power saving mode by notifying to refrain from newly creating a volume in a power control unit having low utilization.

DESCRIPTION OF DRAWINGS

FIG. 6 is an example of a table for the power control unit to determine whether to change to a power saving mode according to the first embodiment;

FIG. 11 is an example of a table for managing tasks to be executed by a power control unit after returning to a normal mode according to the second embodiment;

FIG. 12 is an example of a table for determining whether to return the power control unit to a normal mode according to the second embodiment;

DETAILED DESCRIPTION

Embodiments of the present invention are now explained in detail with reference to the attached drawings. Incidentally, the present invention shall not be limited by the following embodiments.

First Embodiment

The first embodiment illustrates a mode where a storage system identifies a power control unit in which a storage apparatus is to be promptly switched to a power saving mode, and notifies a host system to inhibit the creation of a volume in the power control unit.

Figure 1:
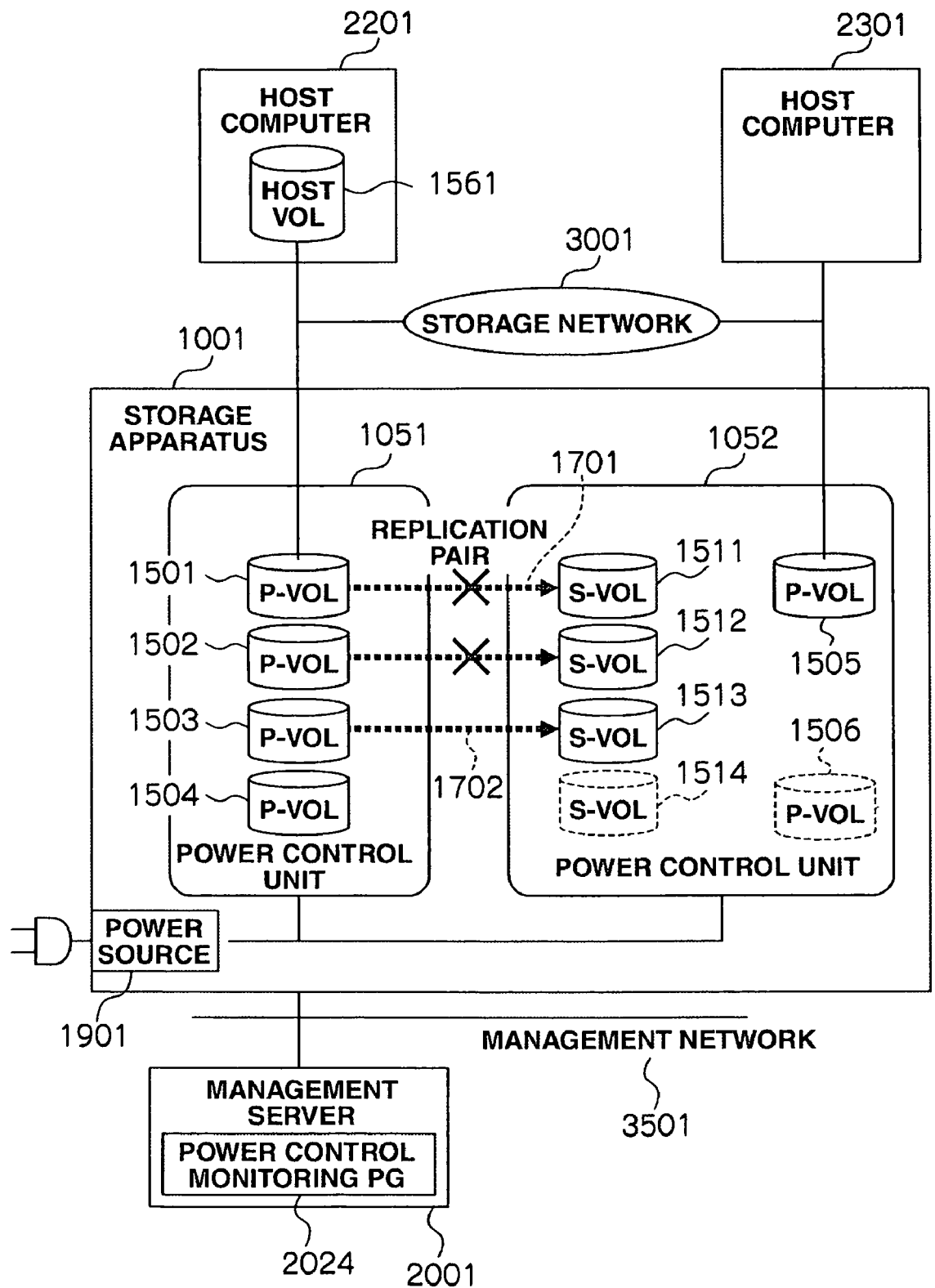
FIG. 1 is a diagram showing a configuration example of a storage system including a computer according to the first embodiment of the present invention.

FIG. 1 is a block diagram showing the configuration of a storage system (including a computer) according to the first embodiment of the present invention.

The host computers 2201 and 2301 are computers such as a personal computer, a workstation, a mainframe or the like. The host computers 2201 and 2301 execute application programs according to the various business operations and usages such as a database. There is no limit in the number of host computers that can be connected to a storage apparatus 1001 via a storage network 3001. The host computers 2201 and 2301 communicate with the storage apparatus 1001 for inputting and outputting commands and data which are required for information processing, and issue a write request when changing data. Since the host computer 2301 is equivalent to the host computer 2201, the explanation thereof may sometimes be omitted.

The storage apparatus 1001 receives commands and data sent via the storage network 3001 to perform prescribed processing, and issues a prescribed reply to the host computer 2201. Data stored in the storage apparatus 1001 can be referred to or changed in logical volume units that can be recognized by the host computer 2201.

A logical volume (P-VOL 1501) can be replicated to another logical volume (S-VOL 1511) with the replication control function provided by the storage apparatus 1001. Here, a pair configured from the P-VOL 1501 and the S-VOL 1511 is referred to as a replication pair 1701, and the status can be changed to Pair or Suspend with the replication control function.

Since the P-VOL 1501 is generally used for business, it is mounted as a host VOL 1561 on a file system operating in the host computer 2201. Although the power control unit 1051 will be described later, if the S-VOL 1511 is used for backup, efficient power control can be realized by centralizing and arranging these in a specific power control unit 1052. FIG. 1 uses a local replication function since the power control units 1051 and 1052 are arranged in the same storage apparatus, but the power control unit 1052 can be arranged in a different storage apparatus from the storage apparatus 1001 by using the remote replication function.

A management server 2001 is a computer for managing the configuration, maintenance and performance of the storage apparatus 1001 through a management network 3501. When a power control monitoring PG (program) 2024 is executed with a CPU (Central Processing Unit) not shown, the management server 2001 checks the configuration and status in the storage apparatus 1001, and notifies the administrator if inappropriate management operation is performed. Here, the power control monitoring PG 2024 itself may be provided in the storage apparatus 1001, and the processing may be executed in the storage apparatus 1001. In addition, by connecting the management server 2001 to the storage network 3001, a configuration that does not use the management network 3501 (i.e., management of "In Band" only) can be realized.

Figure 2:
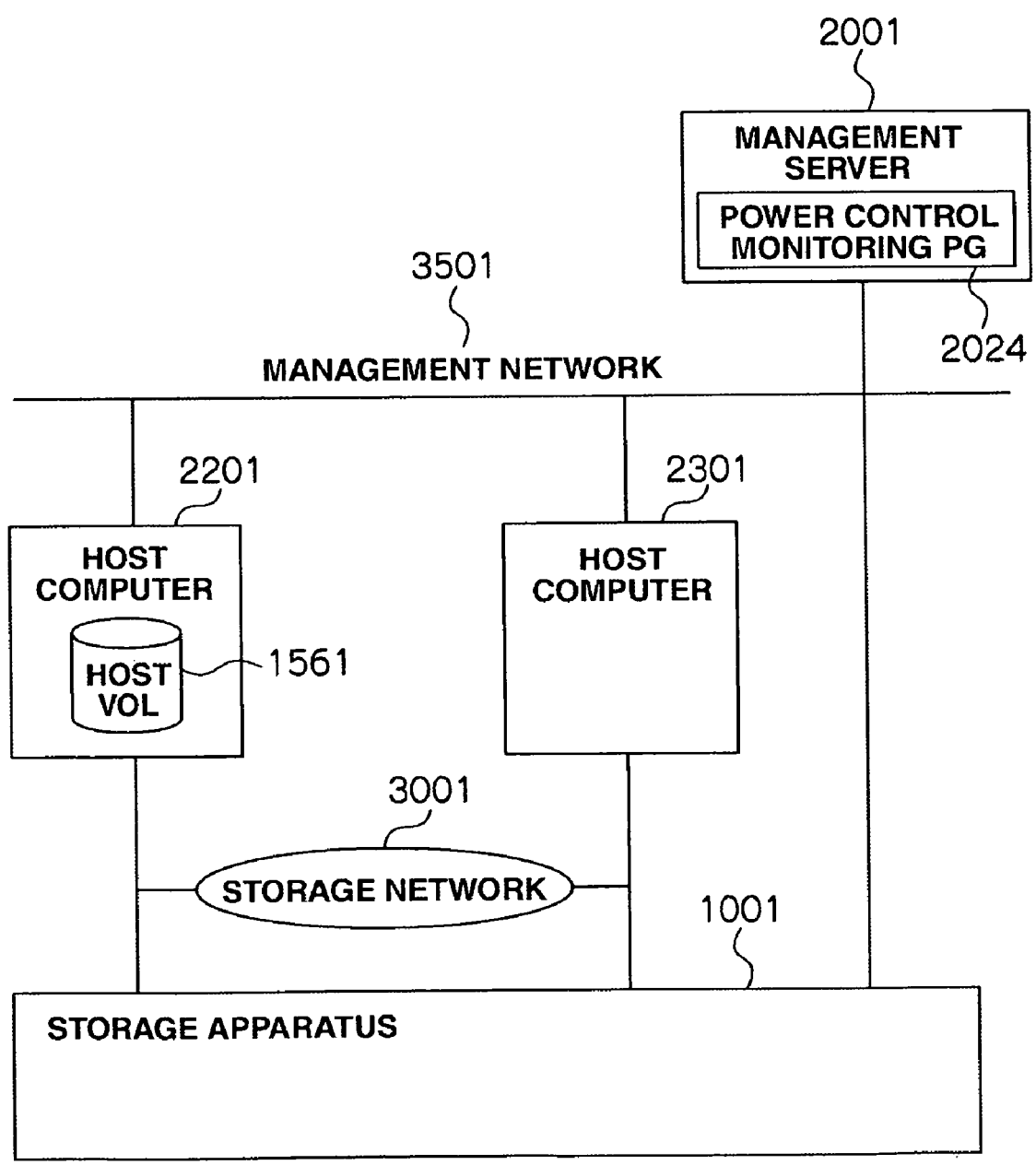
FIG. 2 is a diagram showing a configuration example of a storage system including a computer according to the first embodiment.

FIG. 2 is a block diagram showing the configuration of a storage system that is different from FIG. 1. Here, since the storage apparatus 1001 is configured the same as in FIG. 1, the detailed explanation thereof is omitted. As a result of adopting the configuration of FIG. 2, it is possible to confirm whether the host computers 2201, 2301 are actually using the logical volume provided by the storage apparatus 1001. This is realized by the management server 2001 communicating with the host computers 2201, 2301 via the management network 3501.

Figure 3:
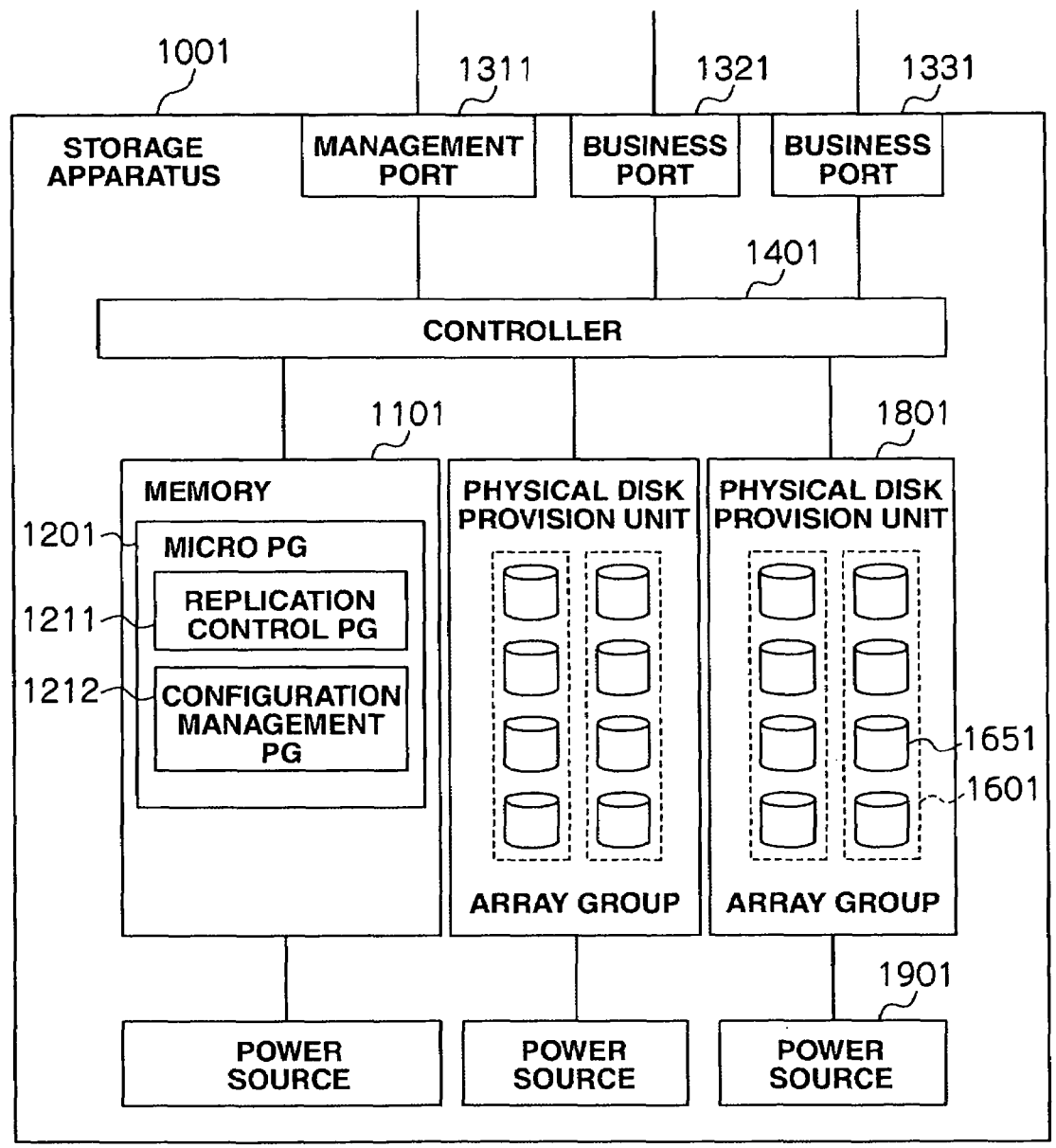
FIG. 3 is a diagram showing a configuration example of a storage apparatus according to the first embodiment.

FIG. 3 is a block diagram showing the configuration in the storage apparatus 1001 as one embodiment of the present invention.

The power consumption of the physical disks 1651 stored in the storage apparatus 1001 can be suppressed individually or in array group (RAID Group) 1601 units by using the MAID technology.

Here, a normal operational status of the storage apparatus 1001 is referred to as a normal mode, a status for suppressing the power consumption of the storage apparatus 1001 is referred to as a power saving mode, and a unit capable of switching the power saving modes is referred to as a power control unit 1501. Nevertheless, since the actual I/O of data is performed In RAID Group 1601 units, the power control unit 1501 may set the array group 1601 to be the minimal unit, or set the constituent feature configured from a plurality of array groups 1601 such as the physical disk provision units 1801 to be the minimal unit in the relationship with the power source 1901 as shown in FIG. 3.

The data referral or write request from the host computer 2201 to the business volume is received by a controller 1401 via a business port 1321 or 1331. The controller 1401 stores (writes) or reads data into a physical volume in an appropriate array group 1601 based on the relationship of a predetermined business volume and the host computer 2201. Here, the I/O can be performed at high speed by using a cache that performs high-speed operations in the storage apparatus 1001.

Requests concerning the configuration setting and maintenance from the management server 2001 are also received by the controller 1401 via the management port 1311. With respect to the configuration setting, the controller 1401 changes the configuration of the volume or changes the construction of the replication relationship and so on by updating the configuration information retained in a cache memory or the like in the storage apparatus 1001. The management port 1311 may share the same port as the business port 1321 or 1322.

The programs to be executed by the controller 1401 are loaded in the memory 1101, and the execution of the respective control programs is controlled by the micro PG 1201. Here, the replication control PG 1211 performs the overall control concerning the replication pair such as changing the status of the replication pair 1701, and managing the differential data of the P-VOL 1501 and the S-VOL 1511. The configuration management PG 1212 is a program for performing the overall control concerning the volume management such as creating/deleting the logical volume or allocating a logical volume to the host computer 2201. The power control monitoring PG 2024 explained with reference to FIG. 1 can also be configured to operate in the micro PG 1201.

Figure 4:
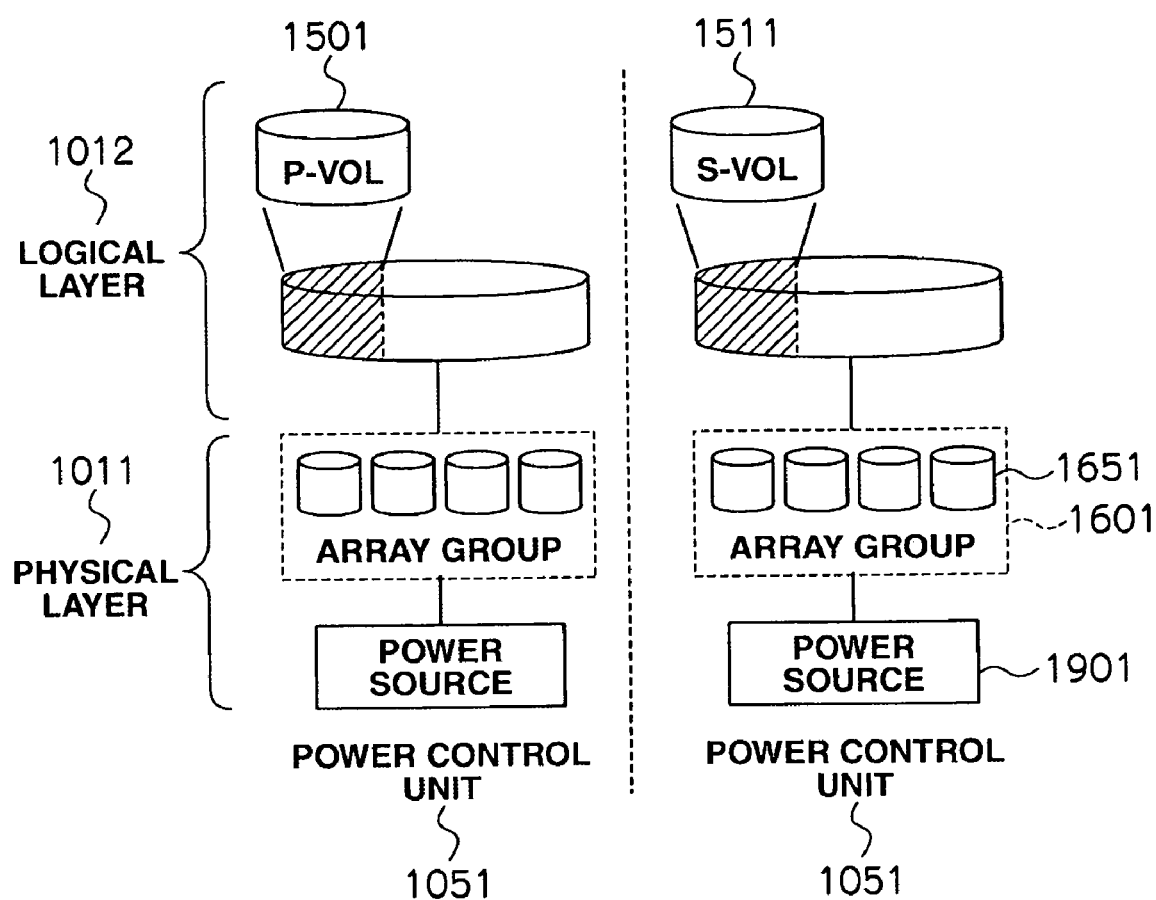
FIG. 4 is a diagram showing a configuration example of a volume in a power control unit according to the first embodiment.

FIG. 4 is a block diagram showing the relationship of the power control unit 1051 and the volume as one embodiment of the present invention. As shown in FIG. 4, the physical disks 1651 configure the array group 1601 in a physical layer 1011 with physical constituent features. Meanwhile, logical volumes (P-VOL 1501, S-VOL 1511) are formed in a logical layer 1012 by arbitrarily partitioning the overall volume provided by the array group 1601. In this example, it is evident that the P-VOL 1501 belongs to the power control unit 1051 as a result of associating the logical layer 1012 and the physical layer 1011. Similarly, it is evident that the S-VOL 1511 belongs to the power control unit 1052.

Figure 5:
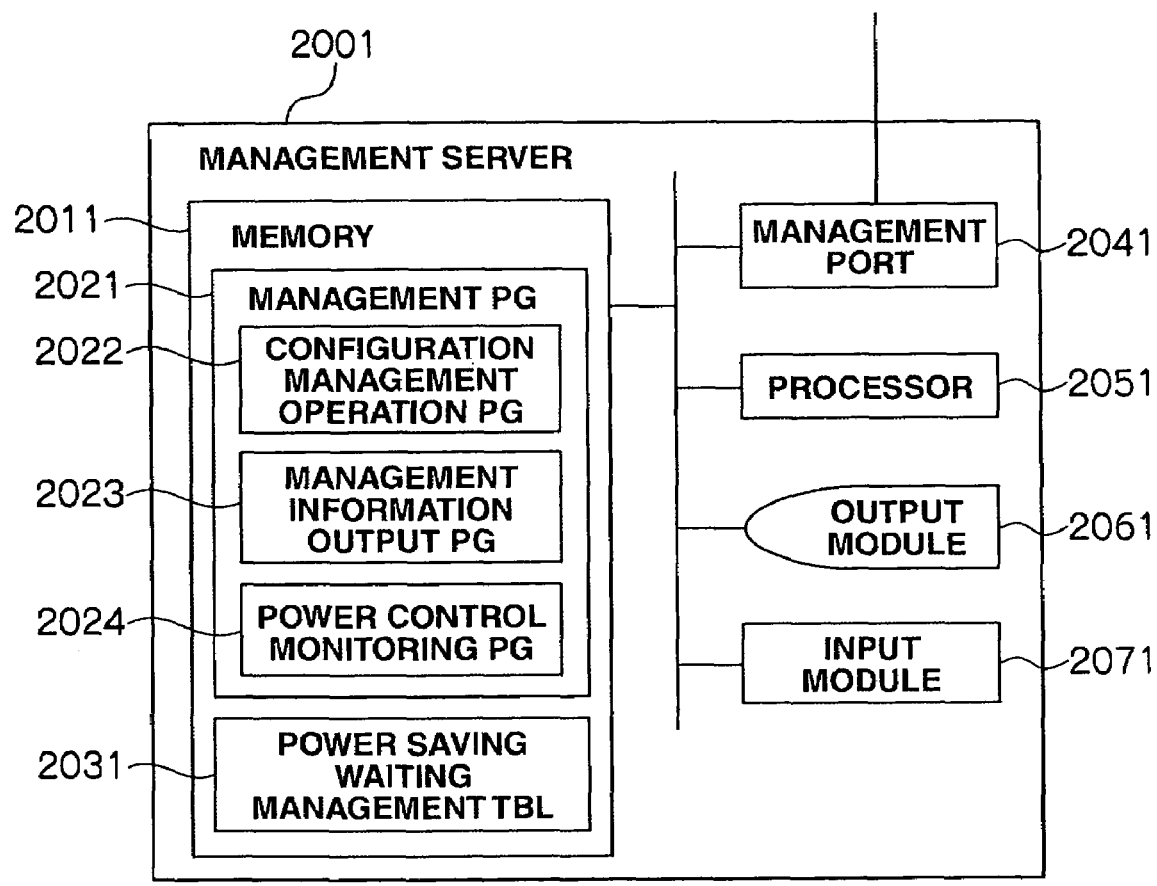
FIG. 5 is a diagram showing a configuration example of a management server according to the first embodiment.

FIG. 5 is a block diagram showing the configuration of the management server 2001 as one embodiment of the present invention. The management server 2001 is connected to the management network 3501 via the management port 2041. The management PG (program) 2021 as a management function provided by the management server 2001 is loaded in the memory 2011, and executed by the processor 2051. A configuration management operation PG (program) 2022 for providing a function of performing operations concerning the configuration of the storage apparatus is loaded in the memory 2011, and executed by the processor 2051. A management information output PG (program) 2023 for providing a function for outputting information to be managed in the management server 2001 is loaded in the memory 2011, and executed by the processor 2051.

The management operation of the management server 2001 is received by an input module 2071 as an interface of a keyboard or a mouse or the like, and the operation result and the status of the storage system are output from an output module 2061 such as a display or an email server. The power saving waiting management TBL (table) 2031 is arbitrarily loaded in the memory 2011 from a secondary storage apparatus (hard disk or the like) in the management server 2001, and used from the power control monitoring PG 2024.

FIG. 6 is a diagram showing a detailed example of the power saving waiting management TBL 2031. The power saving waiting management TBL 2031 is a table for acquiring and storing the S-VOL count of a Pair status and a Suspend status for each power control unit from the storage apparatus 1001 in order to determine whether to switch to the power saving mode. When a power saving control unit is registered in the power saving waiting management TBL 2031, this is notified to the management server 2001. This notification includes contents recommending that the corresponding power control unit should be switched to a power saving mode. The switch to the power saving mode can be performed manually by the administrator upon receiving the foregoing notice, or performed autonomously according to the method explained in the second embodiment described later. In the following determination where the P-VOL 1501 is being used by the host computer 2201, this will be excluded since, basically, it is not possible to switch to the power saving mode.

The power saving waiting management TBL 2031 includes a power control unit column 4002, a Pair status S-VOL count column 4003, a Suspend status S-VOL count column 4004, a priority column 4005, and a waiting time column 4006.

The power control unit column 4002 stores the power control unit. The Pair status S-VOL count column 4003 stores the number of S-VOLs in a Pair status. The Suspend status S-VOL count column 4004 stores the number of S-VOLs in a Suspend status. The priority column 4005 stores priorities as indexes for deciding the frequency of notifying the management server 2001 and the waiting time until switching to the power saving mode. For example, if the priority is "High" the notice may instruct an instant switch (or autonomous switch), and if the priority is "Middle" the processing may be performed after the lapse of a given period of time. This index may be decided in advance based on the power consumption of the power saving control unit, or from the ratio of Suspend status in relation to the overall replication pair count (for instance, the priority is set to "High" if the ratio is high). The waiting time column 4006 stores the waiting time as the time that has elapsed since being registered in the power saving waiting management TBL 2031. The waiting time can be used as a factor for deciding the index such as changing the index from "Low" to "Middle" after the lapse of a given period of time.

H the P-VOL 1501 is being used by the host computer 2201, basically, since it is not possible to switch to the power saving mode, a column for storing the status thereof may also be provided in the power saving waiting management table TBL 2031.

Figure 7:
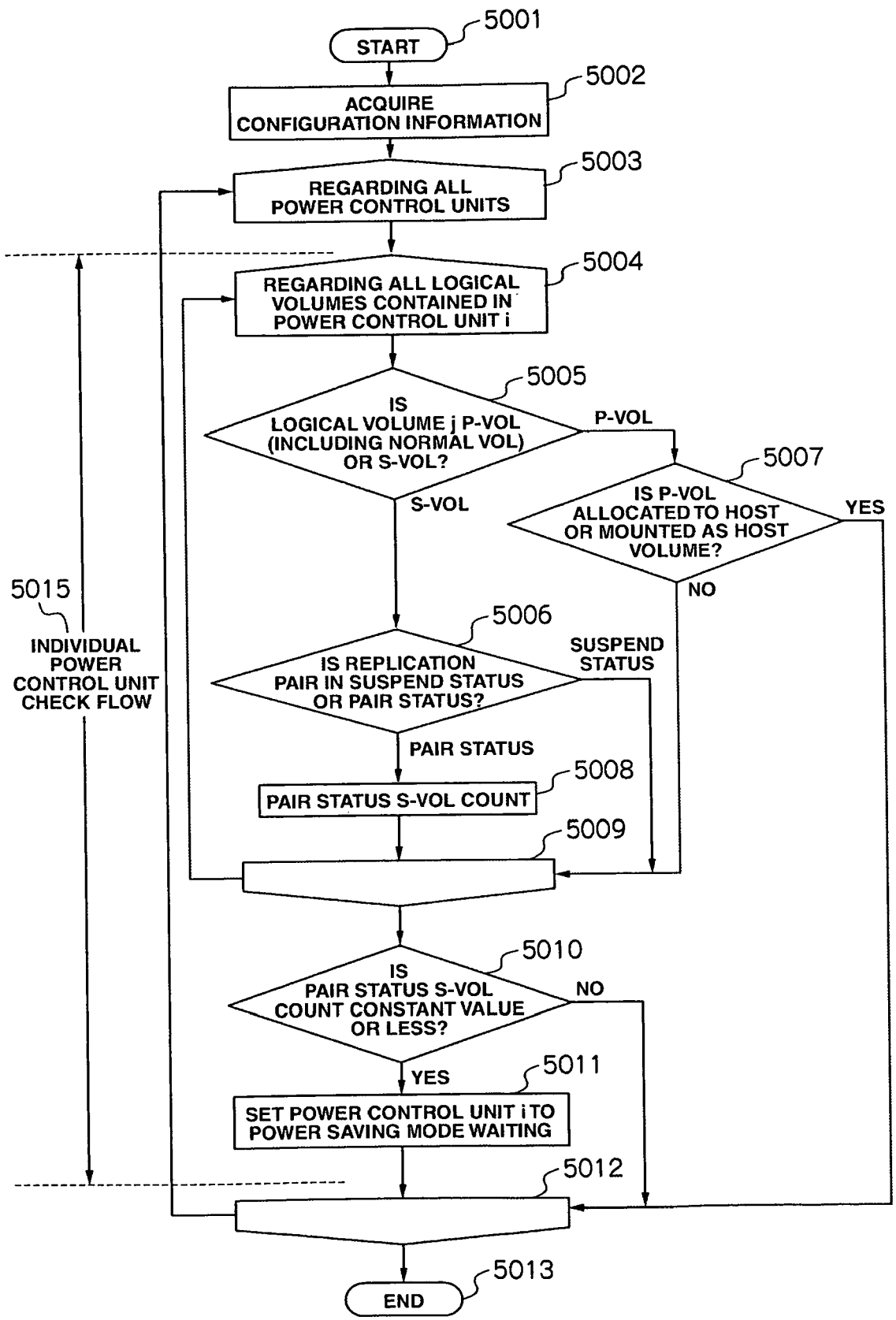
FIG. 7 is a flowchart for determining whether to make the power control unit enter power saving mode waiting according to the first embodiment.

The power control monitoring PG 2024 determines whether the power control unit in the storage apparatus 1001 should be set to power saving waiting. FIG. 7 is a flowchart showing the processing upon the power control monitoring PG 2024 periodically performing the foregoing determination.

Foremost, the power control monitoring PG 2024 acquires configuration information from the storage apparatus 1001 (5002), and performs determination processing regarding all target power control units (5003 to 5012). In the determination, the number of S-VOLs in a Pair status is counted, and if the count is of a constant value or less, this is determined to be power saving mode waiting.

Specifically, the power control monitoring PG 2024 performs the following processing regarding all power control units based on the acquired configuration information (5003).

The power control monitoring PG 2024 performs the following processing regarding all logical volumes contained in the power control unit i (5004). In other words, the power control monitoring PG 2024 determines whether the logical volume j is a P-VOL (including a normal VOL) or a S-VOL (5005). If the logical volume j is determined to be a S-VOL, the power control monitoring PG 2024 determines whether the replication pair is a "Suspend status" or a "Pair status" (5006). If the logical volume j is determined to be a "P-VOL," the power control monitoring PG 2024 determines that the P-VOL is allocated to the host computer 2201, or mounted as a host VOL 1581 (5007).

If the replication pair is determined to be a Pair status at 5006, the power control monitoring PG 2024 counts the number of Pair status S-VOLs (5008). If the number of Pair status S-VOLs is counted, if the replication pair is determined to be a "Suspend status" at 5006, or if the determination is "NO" at 5007, the power control monitoring PG 2024 determines whether the processing regarding all logical volumes contained in the power control unit i is complete (5009). If it is determined that the processing is not complete, the power control monitoring PG 2024 executes the processing once again from 5004 regarding the other logical volumes which have not yet been processed.

If it is determined that the processing regarding all logical volumes included in the power control unit i is complete (5009: YES), the power control monitoring PG 2024 determines whether the Pair status S-VOL count is of a constant value or less (5010). If it is determined that the Pair status S-VOL count is of a constant value or less (5010: YES), the power control monitoring PG 2024 sets the power control unit i to power saving mode waiting (5011). The control power unit determined to be power saving mode waiting is registered in the power saving waiting management TBL 2031.

Like this, if the setting is power saving mode waiting, if the determination is "YES" at 5007, or if it is determined that the Pair status S-VOL count is not less than a constant value at 5010 (5010: NO), the power control monitoring PG 2024 determines whether processing regarding all power control units is complete (5012). If it is determined that the processing is not complete, the power control monitoring PG 2024 executes the processing from 5003 regarding the other power control units which have not yet been processed.

Incidentally, the power control monitoring PG 2024 may periodically perform the checking as with the processing of the flowchart shown in FIG. 7, or perform the checking at the timing that the management operation was performed. If the checking is performed at the timing that the management operation was performed, the determination processing of a part of the individual power control unit check flow 5015 is used.

Figure 8:
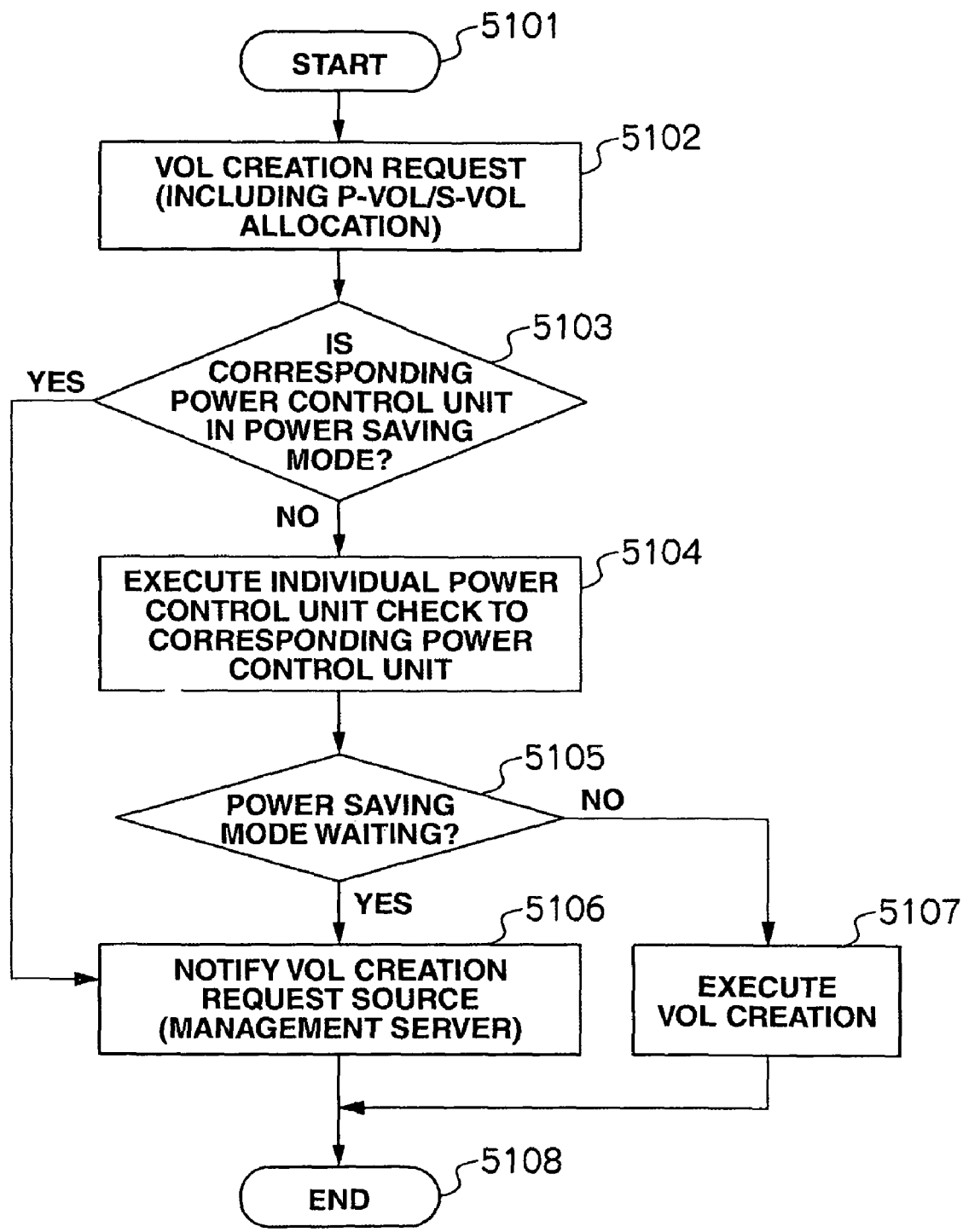
FIG. 8 is a flowchart for determining whether to notify the management server upon creating a logical volume in the power control unit of power saving mode waiting according to the first embodiment.

FIG. 8 is a flowchart showing the processing of the power control monitoring PG 2024 determining the availability when a logical volume creation command is issued as the management operation, and notifying the management server 2001.

When creating a logical volume (including the allocation of the P-VOL 1501 or the S-VOL 1511) in a power control unit based on a power control unit logical volume creation request (5012), the power control monitoring PG 2024 determines whether that power control unit is set to power saving mode waiting using the power saving waiting management TBL 2031 or the individual power control unit check flow 5015 (5103). If the corresponding power control unit is not a power saving mode (5103: NO), the power control monitoring PG 2024 executes individual power control unit check to the corresponding power control unit (5104). Meanwhile, if the corresponding power control unit is a power saving mode (5103: YES), the routine proceeds to the processing at 5106 described later.

The power control monitoring PG 2024 determines whether the setting is power saving mode waiting (5105). If the setting is power saving mode waiting (5105; YES), the power control monitoring PG 2024 notifies the operation command source (management server 2001) not to perform the operation since it will be difficult to switch to the power saving mode promptly if a logical volume is newly created in the corresponding power control unit (5106). Meanwhile, if the setting is not a power saving mode waiting (5105: NO), the power control monitoring PG 2024 accepts the operation request (5107). The basis for the foregoing determination is that it would be advantageous to switch to the power saving mode since it could be said that the I/O to the corresponding power control unit is low when there are numerous Suspend status S-VOLs or few Pair status S-VOLs.

According to the storage system of the first embodiment, efficient power consumption reduction can be realized while maintaining the power saving mode for a long period of time since the power saving mode is not be released promptly.

Second Embodiment

The second embodiment explains a mode of switching a power control unit in power saving waiting to a power saving mode in the storage system, a mode for executing the replication control to the power control unit in a power saving mode while remaining in the power saving mode, and a mode for returning to a normal mode.

Figure 9:
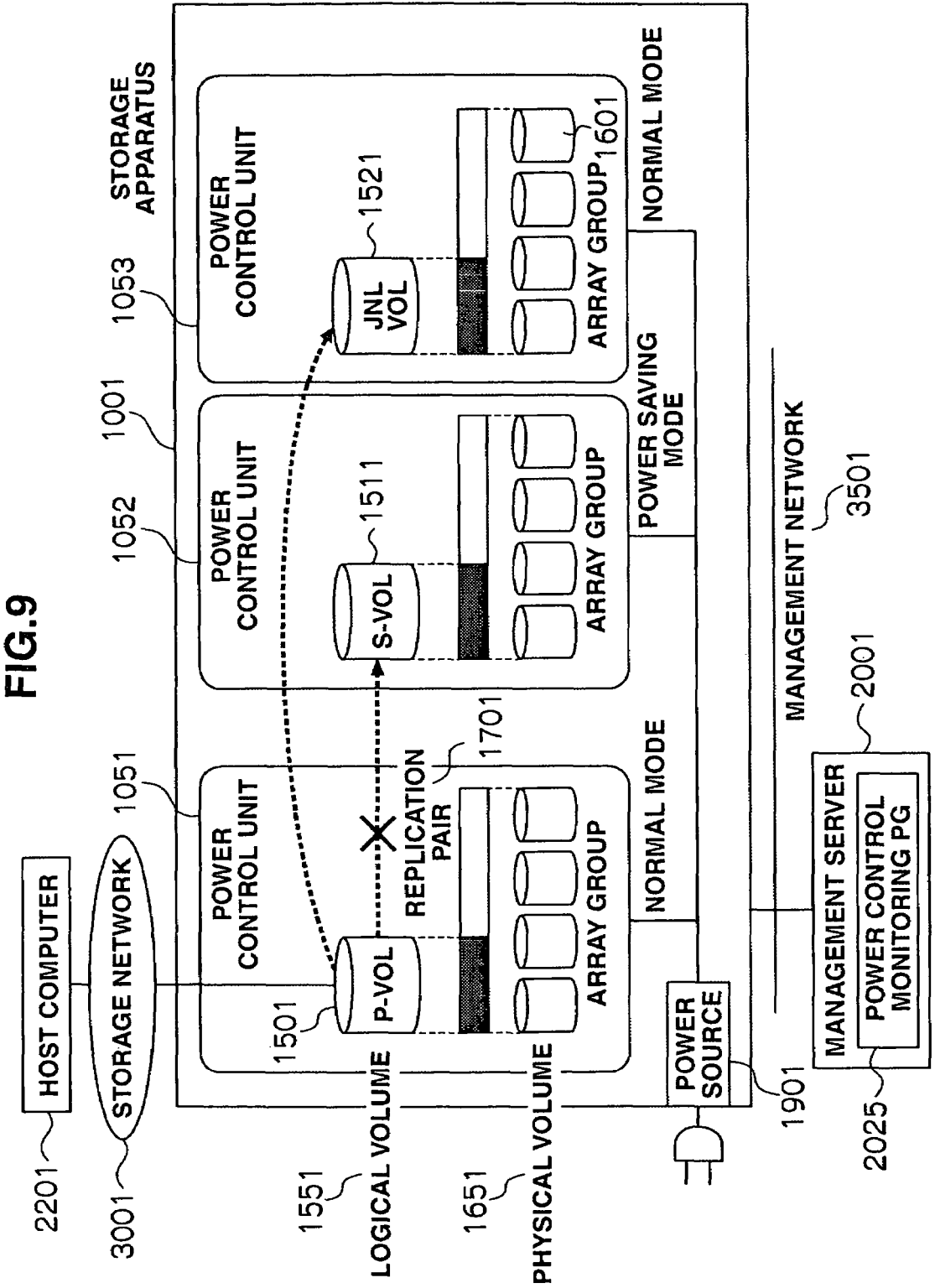
FIG. 9 is a diagram showing a configuration example of a storage system including a computer according to the second embodiment of the present invention.

FIG. 9 is a block diagram showing the configuration of a storage system (including a computer) as one embodiment of the present invention.

Since the basic explanation regarding the host computer, the storage apparatus (including the power control unit, volume, etc.), and the management computer are the same as the storage system explained with reference to FIG. 1, the same reference numeral is assigned to the same component, and the explanation thereof is omitted. Although this will be explained in detail later, the management server 2001 executes the power control management PG 2025. The configuration may also be such that the power control management PG 2025 itself is provided in the storage apparatus 1001. In addition, by connecting the management server 2001 to the storage network 3001, a configuration that does not use the management network 3501 (i.e., management of "In Band" only) can be realized.

As shown in FIG. 9, a case is considered where there is a replication pair 1701 in which the P-VOL 1501 is arranged in the power control unit 1051 and the S-VOL 1511 is arranged in the power control unit 1052, and the power control unit 1052 is in a power saving mode. As a precondition, the replication pair 1701 is of a Suspend status. Here, there may be a plurality of replication pairs.

Let it be assumed that Resync is executed to the replication pair 1701 as the management operation. Since this operation usually ends in a failure, the setting must be returned to a normal mode in advance. If the setting is returned to the normal mode, this is inefficient since the power consumption of not only the corresponding volume, but also of the overall power control unit, will increase. Thus, the differential data of the P-VOL 1501 after Resync is temporarily stored in another power control unit 1053 of a normal mode while maintaining the power saving mode of the power control unit 1052. Let is further be assumed that a JNL VOL 1521 is used for storing the differential data.

In addition, the other operations to the power control unit 1052; namely, the creation/deletion of a volume and the Split of the Resynced logical volume can be completed while maintaining the power saving mode. Nevertheless, since each of these operations is not being executed and completed according to the command, these operations are managed as execution waiting tasks (to be explained later with reference to FIG. 11), and return processing is executed after the power control unit 1052 returns to the normal mode.

Figure 10:
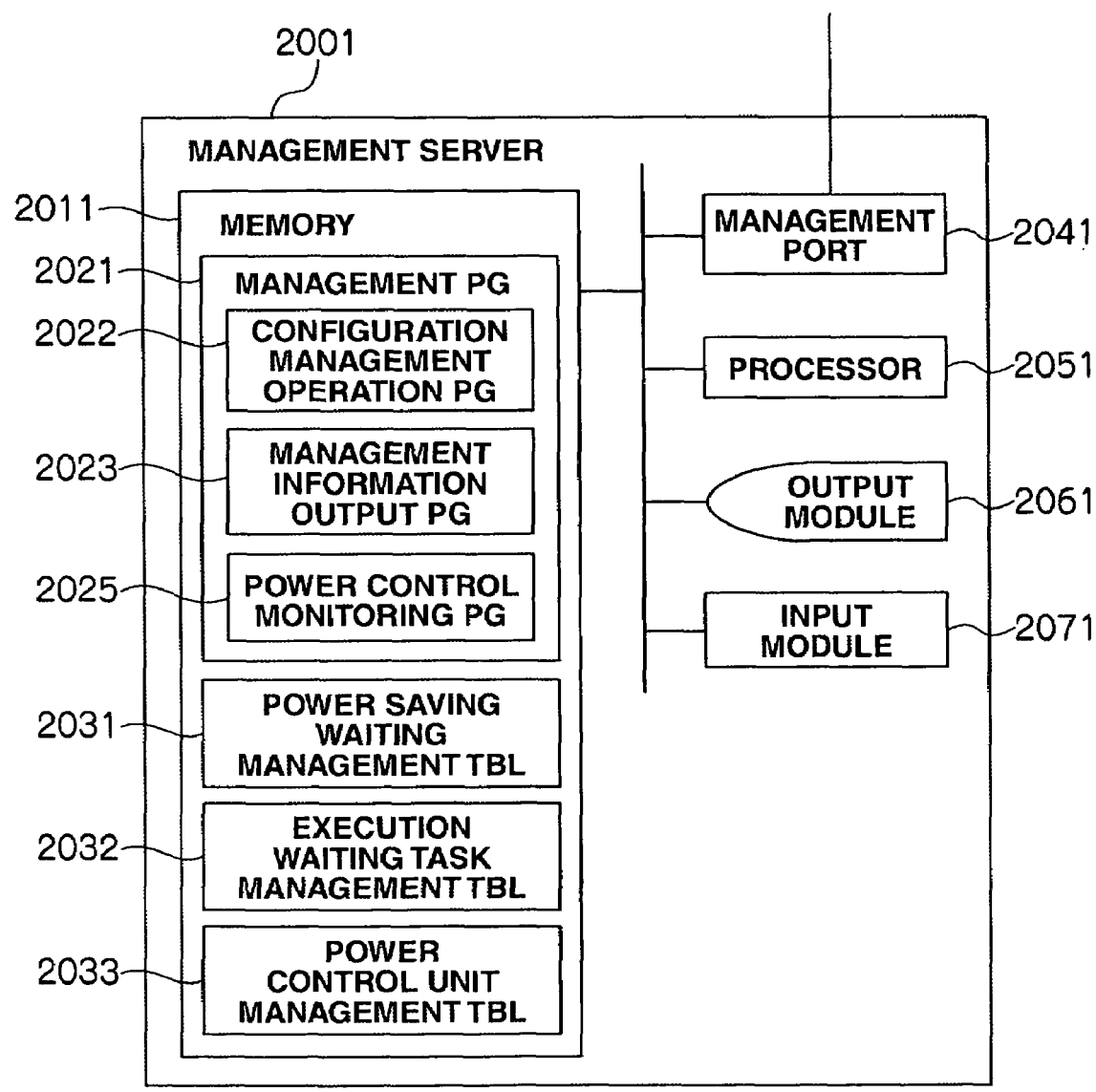
FIG. 10 is a diagram showing a configuration example of a management server according to the second embodiment.

FIG. 10 is a block diagram showing the configuration of the management server 2001 as one embodiment of the present invention. Since the basic explanation is the same as FIG. 5, the same reference numeral is assigned to the same component, and the detailed explanation thereof is omitted. The power saving waiting management TBL 2031, the execution waiting task management TBL 2032, and the power control unit management TBL 2033 are loaded into the memory 2011 from the secondary storage apparatus (hard disk, etc.) in the management server 2001, and used by the power control management PG 2025.

The power saving waiting management TBL 2031, the execution waiting task management TBL 2032, and the power control unit management TBL 2033 are now explained. The power saving waiting management TBL 2031 is configured the same as shown in FIG. 6, and the detailed explanation thereof is omitted.

FIG. 11 shows a detailed example of the execution waiting task management TBL 2032. The execution waiting task management TBL 2032 retains tasks that were temporarily executed using another power control unit to maintain the power saving mode, or which are simply in execution waiting. These tasks are executed after the corresponding power control unit returns to the normal mode.

The execution waiting task management TBL 2032 includes a power control unit column 4101, a task ID column 4102, a task type column 4103, a replication pair column 4104, a P-VOL column 4105, a S-VOL column 4106, and a JNL VOL column 4107.

The power control unit column 4101 stores information showing the power control unit. The task ID column 4102 stores the ID for identifying the task. The task type column 4103 stores information showing the type of execution waiting task. This information is associated with the processing to be executed after returning to the normal mode. The replication pair column 4104 stores information for identifying the replication pair. The P-VOL column 4105 stores information for identifying the P-VOL. The S-VOL column 4106 stores information for identifying the S-VOL. The JNL VOL column 4107 stores information for identifying the JNL VOL 1521.

For example, regarding the task ID 0013, this shows that although Resync was executed to the replication pair Pair 002, the target S-VOL 00:a1:56 is in the power control unit 001 of a power saving mode, and differential data is being stored in the JNL VOL 00:b3:02 of another power control unit. Here, the processing to be executed after the power control unit 001 returns to the normal mode is the execution of Resync of the replication pair Pair 002 and the deletion of the JNL VOL 00:b3:02 (to be explained later with reference to FIG. 18).

FIG. 12 is a diagram showing a detailed example of the power control unit management TBL 2033. The power control unit management TBL 2033 is a table for managing the status of the JNL VOL 1521 storing differential data for the execution waiting task and the execution waiting task count, and determining whether to return the corresponding power control unit to a power saving mode.

The power control unit management TBL 2033 includes a power control unit column 4201, a JNL VOL remaining capacity column 4202, a JNL VOL I/O column 4203, an execution waiting task count column 4204, a power saving mode duration column 4205, and a monitoring period column 4206.

The power control unit column 4201 stores information showing the power control unit. The JNL VOL remaining capacity column 4202 stores the remaining capacity of the JNL VOL 1521. This information is the ratio showing the remaining capacity in relation to the overall capacity of the JNL VOL 1521 in the second embodiment. The JNL VOL I/O column 4203 stores the I/O amount per unit time. The execution waiting task count column 4204 stores the number of tasks in execution waiting. The power saving mode duration column 4205 stores the period that the power saving mode is maintained. The monitoring period column 4206 stores the period of monitoring the power control.

Since the JNL VOL 1521 is not able to store differential data in excess of the foregoing capacity, the JNL VOL remaining capacity is acquired from the JNL VOL remaining capacity column 4202 and, if the JNL VOL remaining capacity exceeds the constant value, the power control unit 001 is returned to the normal mode. Here, although the JNL VOL remaining capacity stored in the JNL VOL remaining capacity column 4202 is the ratio of the remaining capacity in relation to the overall capacity, it may also be the remaining capacity.

The JNL VOL I/O column 4203 shows whether the I/O to the JNL VOL 1521 is Write and/or Read. If there is much I/O to the JNL VOL 1521, since this may affect the performance to the other volumes in the power control unit, information is acquired from the JNL VOL I/O column 4203 and, if the information is of a constant value or higher, the power control unit 001 is returned to the normal mode.

The execution waiting task count stored in the execution waiting task count column 4204 is the number of execution waiting tasks in the corresponding power control unit. If there are many execution waiting tasks, this means that the JNL VOL 1521 is being used considerably, and there is a possibility that the unused capacity in the corresponding power control unit will be compressed. Thus, if the execution waiting task count is of a constant value or higher, the power control unit is returned to the normal mode.

By estimating how much power was actually reduced based on the monitoring period of the monitoring period column 4206 and the power saving mode duration of the power saving mode duration column 4205, the threshold value of determination can be changed for power control units having a low power efficiency. For instance, if the power saving mode ratio is 60% or less, the threshold value of the JNL VOL remaining capacity column 4202 can be changed from 60% to 70%.

Figure 13:
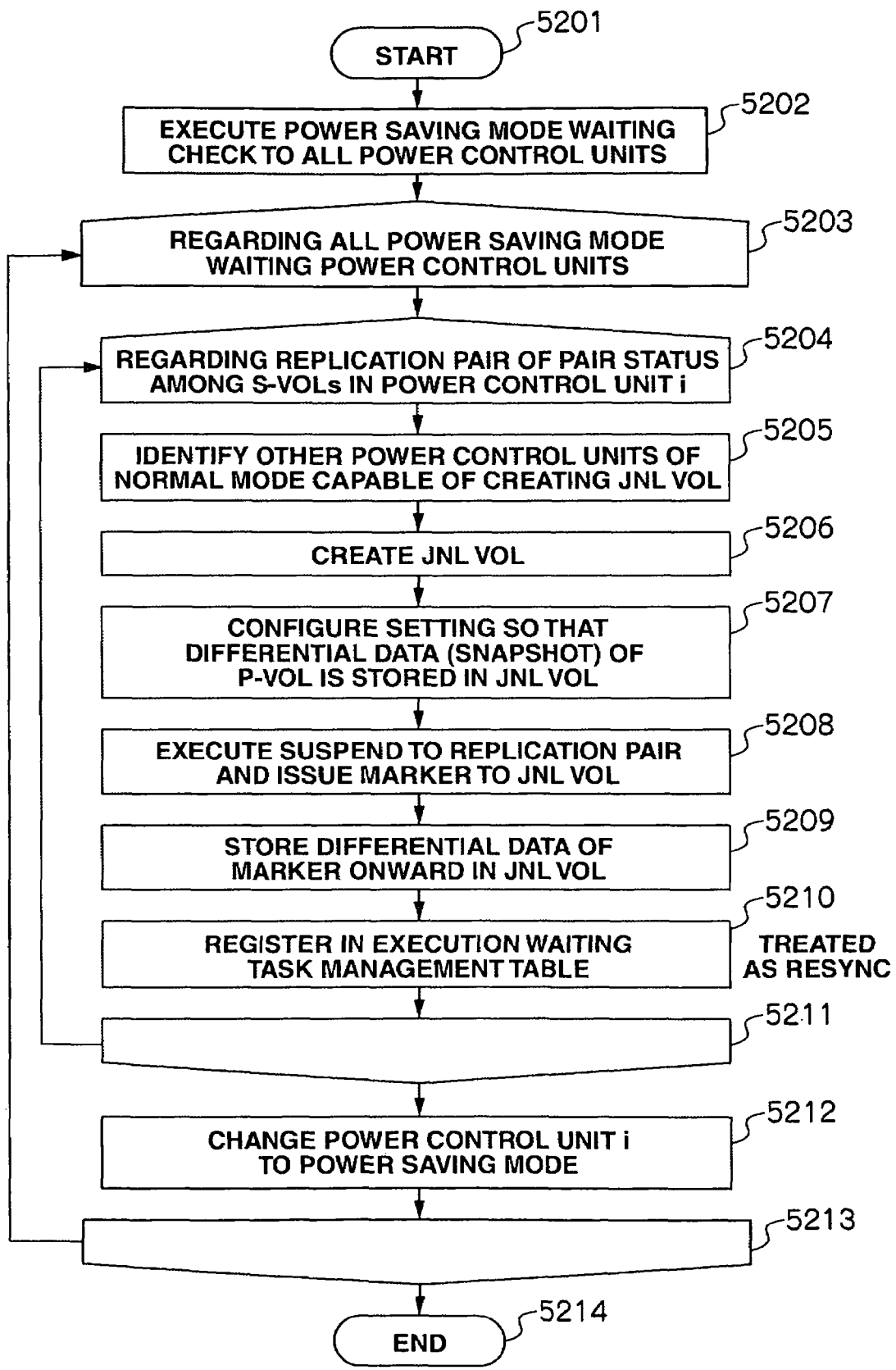
FIG. 13 is a flowchart for changing the power control unit to a power saving mode according to the second embodiment.

FIG. 13 is a flowchart showing the processing to be performed by the power control management PG 2025 for changing the power control unit in power saving mode waiting from a normal mode to a power saving mode.

The determination of whether to set the power control unit to power saving mode waiting (5202) uses the flowchart of FIG. 7 or the individual power control unit check flow 5015 of FIG. 7, and the explanation thereof is omitted.

The power control management PG 2025 performs the following processing regarding all power saving mode waiting power control units (5203).

The power control management PG 2025 performs the following processing regarding the replication pairs in a Pair status among the S-VOLs in the power control unit of a power saving mode waiting (5204). The power control management PG 2025 identifies the other power control units of a normal mode that are not in power saving mode waiting (5205), and creates a JNL VOL 1521 in the other power control units (5206). The JNL VOL 1521 is based on an After Journal format since differential information can be applied to the S-VOL after returning to the normal mode. Here, the power control management PG 2025 sets the JNL VOL 1521 for storing differential data of the P-VOL (5207).

Subsequently, the power control management PG 2025 issues a Split command to the replication pair so that an I/O is not issued to the S-VOL, and changes the status to a Suspend status. Here, a marker is issued to the JNL VOL 1521 for synchronizing the S-VOL and the JNL VOL (5208), and differential data (update information) from immediately after entering the Suspend status is stored in the JNL VOL 1521 (5209).

After the returning to the normal mode, the power control management PG 2025 registers the task type as Resync in the execution waiting task management TBL 2032 so that the Resync is executed properly (5210). Whether the foregoing processing has been performed to all replication pairs (that coincide with the condition) in the foregoing power control unit is determined (5211). If it is determined that the processing has not been performed to all replication pairs, the processing from 5204 is once again perform to the replication pairs that have not yet been processed. If it is determined that the processing has been performed to all replication pairs, the power control unit is changed to the power saving mode (5212).

The power control management PG 2025 determines whether the foregoing processing has been performed to all power control units in power saving mode waiting (5213). If it is determined that the processing has not been performed to all control units, the processing from 5203 is once again performed to the other power control units in power saving mode waiting. If it is determined that the processing has been performed to all control units, finally, a notice indicating the completion of change processing to the power saving mode is issued to the management server 2001 (5214).

Figure 14:
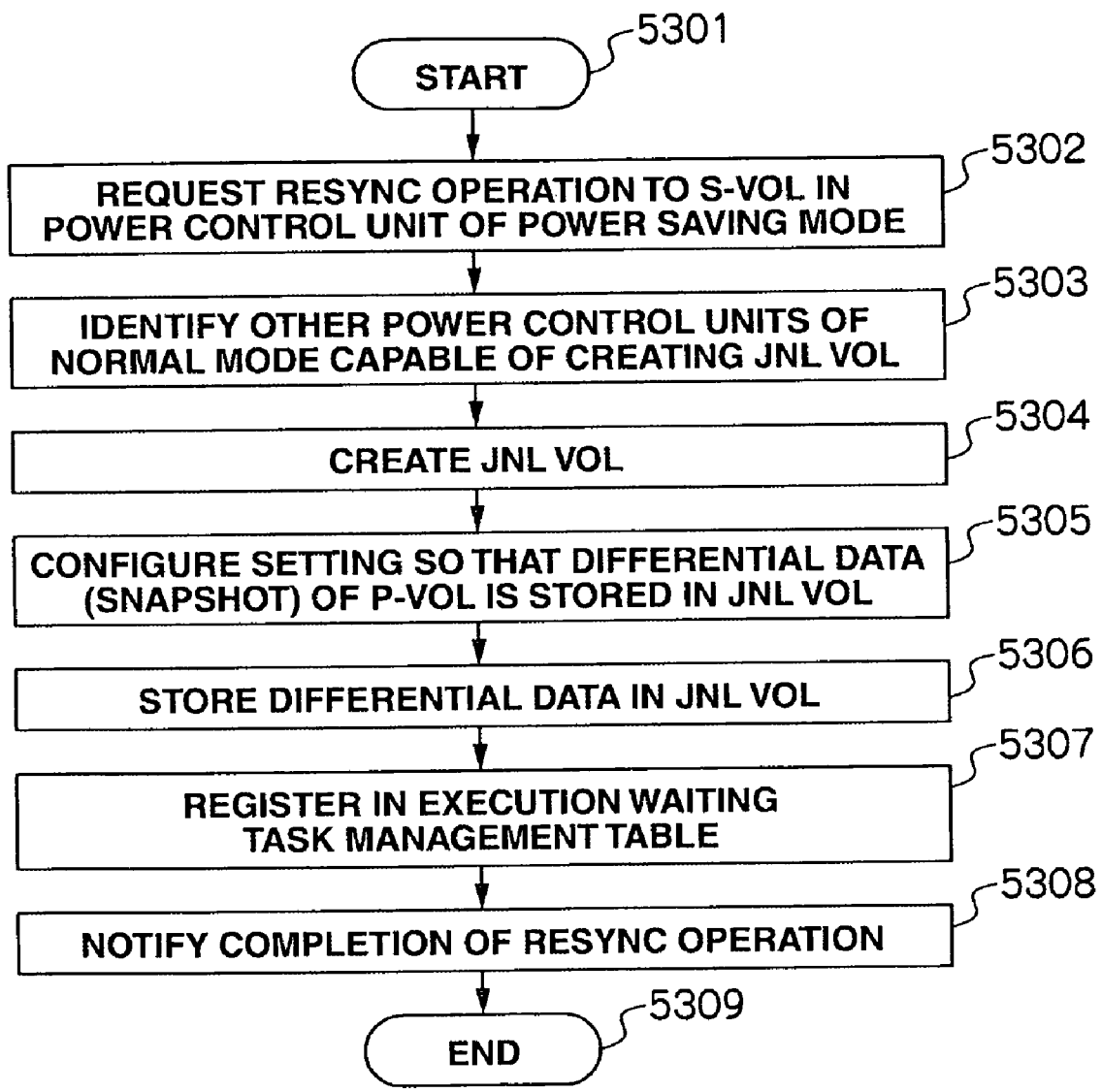
FIG. 14 is a flowchart for the power control unit to execute Resync while maintaining the power saving mode according to the second embodiment.

FIG. 14 is a flowchart showing the processing to be executed by the power control management PG 2025 when a Resync operation request is issued to the S-VOL in the power control unit in a power saving mode. This processing basically includes similar processing as the processing explained with reference to FIG. 13.

Upon receiving a Resync operation request to the S-VOL in the power control unit in a power saving mode (5302), the power control management PG 2025 identifies the other power control units of a normal mode that are not in power saving mode waiting (5303), and creates a JNL VOL 1521 in the other power control units (5304). The JNL VOL 1521 is based on an After Journal format since differential information can be applied to the S-VOL after returning to the normal mode. Here, the power control management PG 2025 sets the JNL VOL 1521 for storing differential data of the P-VOL (5305), and stores the differential data in the JNL VOL 1521 (5306).

Subsequently, the power control management PG 2025 issues a Split command to the replication pair so that an I/O is not issued to the S-VOL, and changes the status to a Suspend status. After the returning to the normal mode, the power control management PG 2025 registers the task type as Resync in the execution waiting task management TBL 2032 so that the Resync is executed properly (5307), and finally notifies the Resync completion to the management server 2001 (5308).

Figure 15:
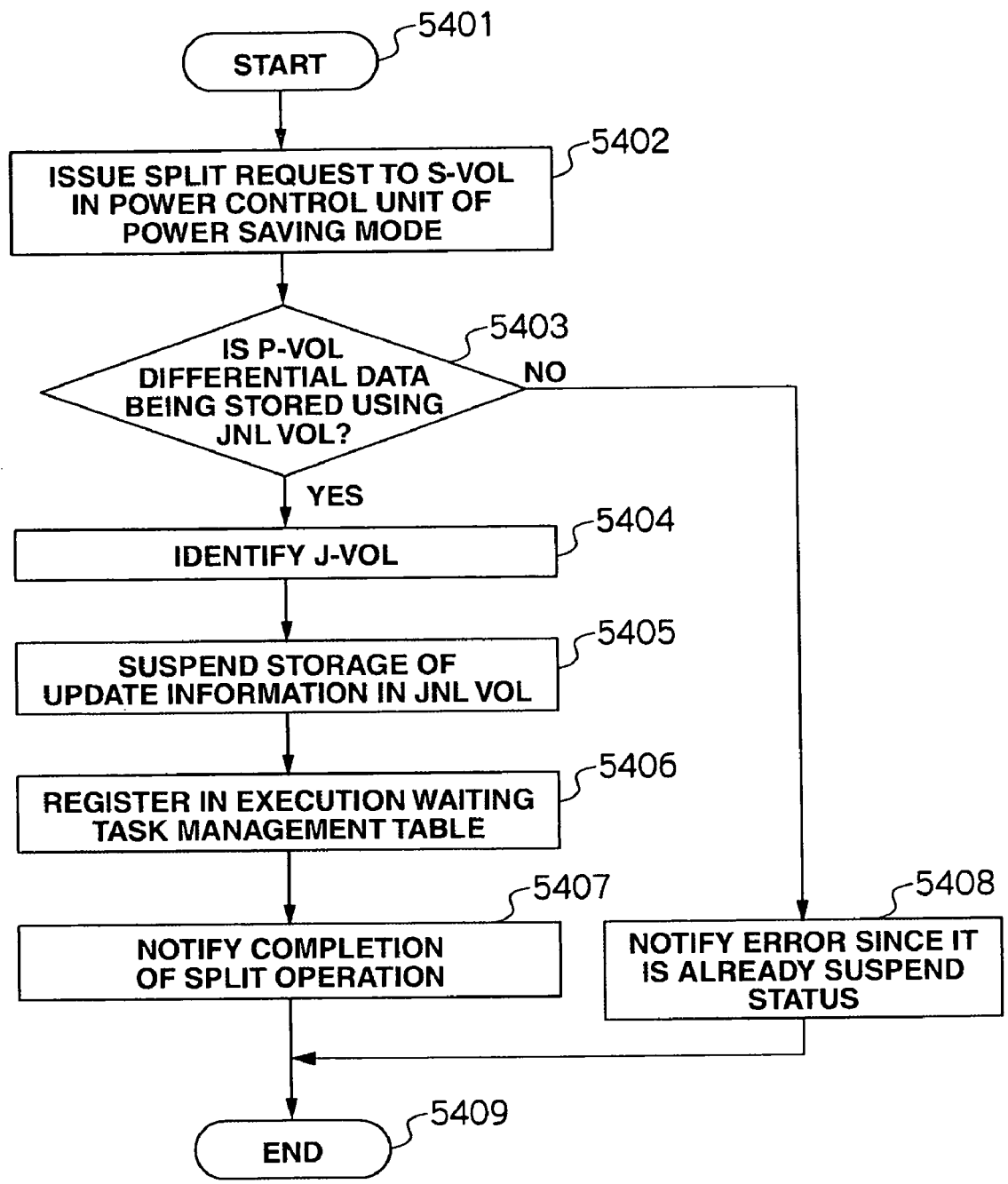
FIG. 15 is a flowchart for the power control unit to execute Split while maintaining the power saving mode according to the second embodiment.

FIG. 15 is a flowchart showing the processing to be performed by the power control management PG 2025 when executing Split to the replication pair in a Pair status using the JNL VOL 1521 in the processing of FIG. 14.

When the power control management PG 2025 receives the Split request to the S-VOL in the power control unit of a power saving mode (5402), the power control management PG 2025 determines whether P-VOL differential data is being stored using the JNL VOL 1521 (5403).

If it is determined that the JNL VOL 1521 is not being used (5403: NO), since that replication pair is already in a Suspend status, the power control management PG 2025 outputs an error to the management server 2001 (5408).

If it is determined that the JNL VOL 1521 is being used (5403: YES), the power control management PG 2025 identifies that JNL VOL 1521 (5404), and suspends the storage of update information in the JNL VOL 1521 (5405). The power control management PG 2025 thereafter registers Split as the task type in the execution waiting task management TBL 2032 so that data of the P-VOL at the time of Split after the normal mode recovery is reflected in the S-VOL (5406). Finally, the power control management PG 2025 notifies Split completion to the management server 2001 (5407).

Figure 16:
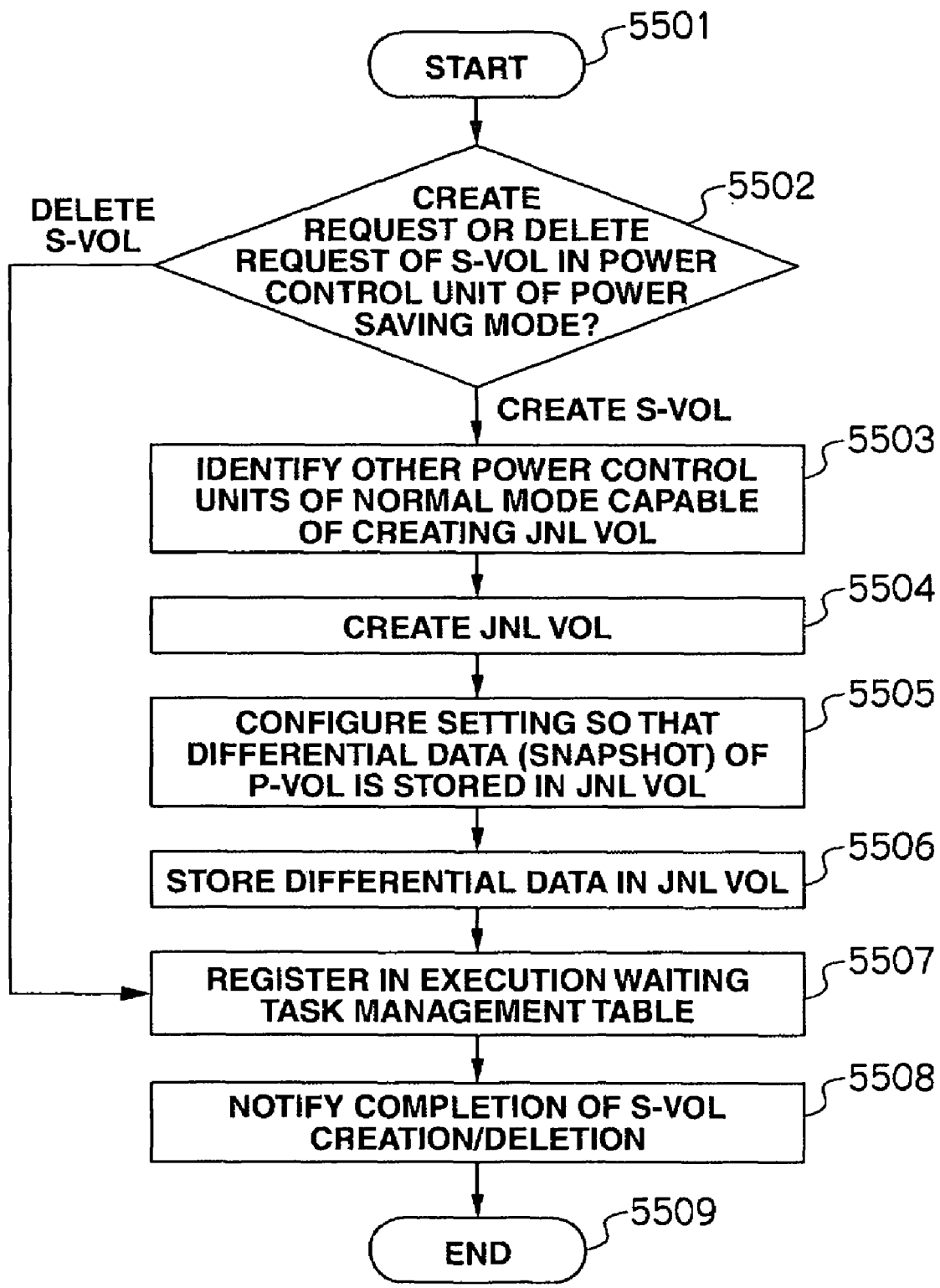
FIG. 16 is a flowchart for the power control unit to execute the creation or deletion of S-VOL while maintaining the power saving mode according to the second embodiment.

FIG. 16 is a flowchart showing the processing to be performed by the power control management PG 2025 for creating or deleting the S-VOL in the power control unit of a power saving mode.

The power control management PG 2025 determines whether the received request is for creating or deleting the S-VOL in the power control unit of a power saving mode (5502).

If it is determined that the request is S-VOL deletion (5502: S-VOL deletion), the power control management PG 2025 makes a registration in the execution waiting task management TBL 2032 so that the corresponding S-VOL is deleted after the normal mode recovery (5507).

If it is determined that the request is S-VOL creation (5502: S-VOL creation), the power control management PG 2025 foremost identifies the other power control units of a normal mode that are not in power saving mode waiting (5503), and creates a JNL VOL 1521 in the other power control units (5504). This is based on the precondition that the P-VOLs are in power control units of a normal mode, and these are used to create a new replication pair. The JNL VOL 1521 is based on an After Journal format since differential information can be applied to the S-VOL after returning to the normal mode. Here, the power control management PG 2025 sets the JNL VOL 1521 for storing differential data (snapshot) of the P-VOL (5505), and stores the differential data in the JNL VOL 1521 (5506). After the returning to the normal mode, the power control management PG 2025 registers the task type as Resync in the execution waiting task management TBL 2032 so that the S-VOL creation is executed properly (5507).

When the registration in the execution waiting task management TBL 2032 at 5507 is complete, the power control management PG 2025 notifies the completion of S-VOL creation/deletion to the management server 2001 (5508).

Figure 17:
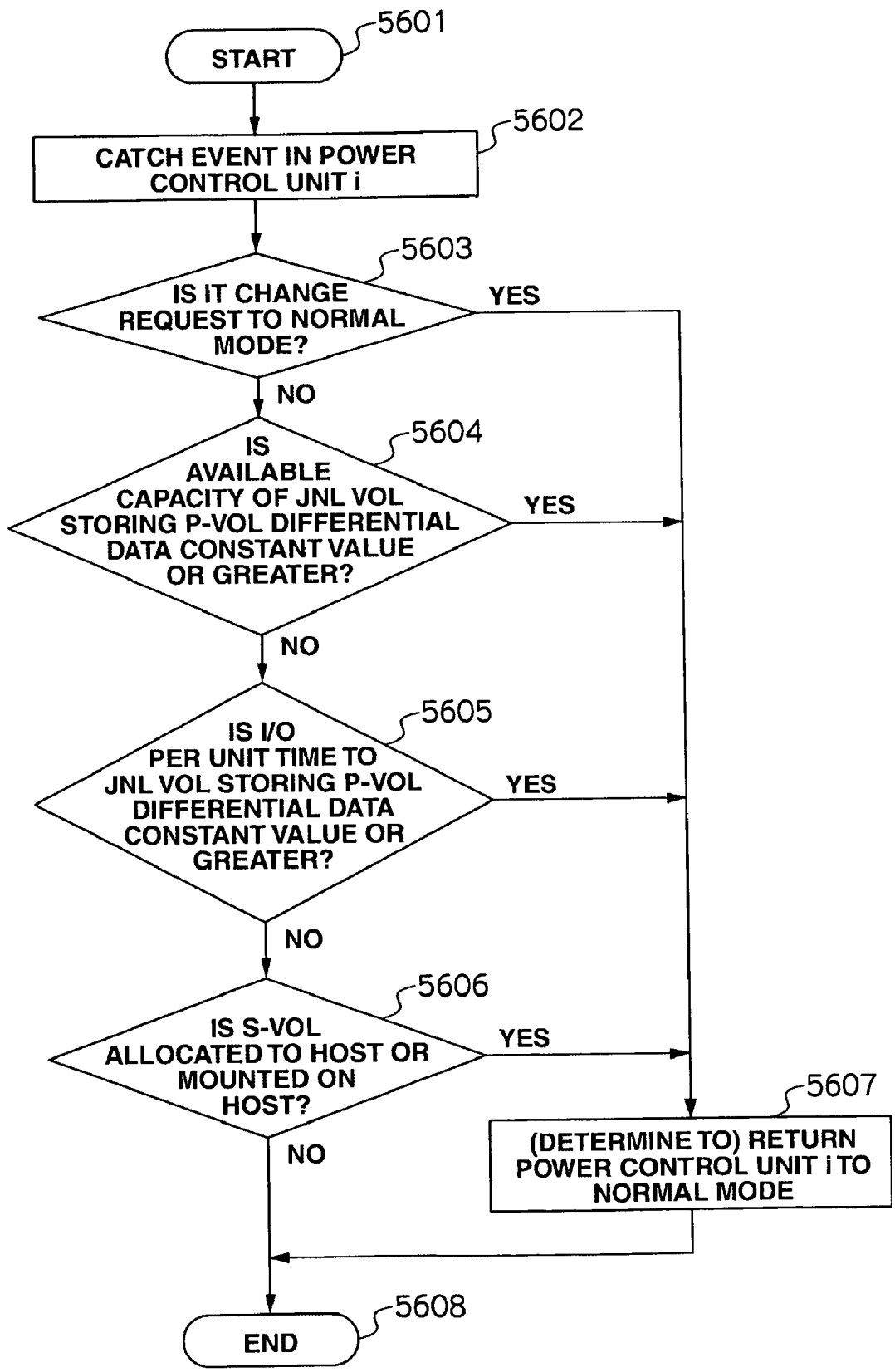
FIG. 17 is a flowchart for determining whether to return the power control unit to a normal mode according to the second embodiment.

FIG. 17 is a flowchart showing the processing to be performed by the power control management PG 2025 for determining whether to return the power control unit from a power saving mode to a normal mode.

The power control management PG 2025 acquires failure information and management information as events from the power control unit via the management port 1311 (5602). Here, an event may include those to be received by the power control management PG 2025, as well as those to be acquired actively from the management target.

The power control management PG 2025 performs the determination processing from 5603 to 5606 to the acquired events. At 5603, it is determined whether the request is a change request to the normal mode. At 5604, it is determined whether the available capacity of the JNL VOL 1521 storing the P-VOL differential data is of a constant value or higher. At 5605, it is determined whether the I/O per unit time to the JNL VOL 1521 storing the P-VOL differential data is of a constant value or higher. At 5606, it is determined whether the S-VOL is allocated to or mounted on the host. Steps 5604 and 5605 can be determined by referring to the power control unit management TBL 2033.

If the determination result is "YES" in any of the steps from 5603 to 5606, the corresponding power control unit is determined to be returned to the normal mode (5607), and the power control management PG 2025 outputs a change command for changing the mode to a normal mode to the storage apparatus 1001. Meanwhile, if the determination result is "NO" in any of the steps from 5603 to 5606, the processing is ended.

Figure 18:
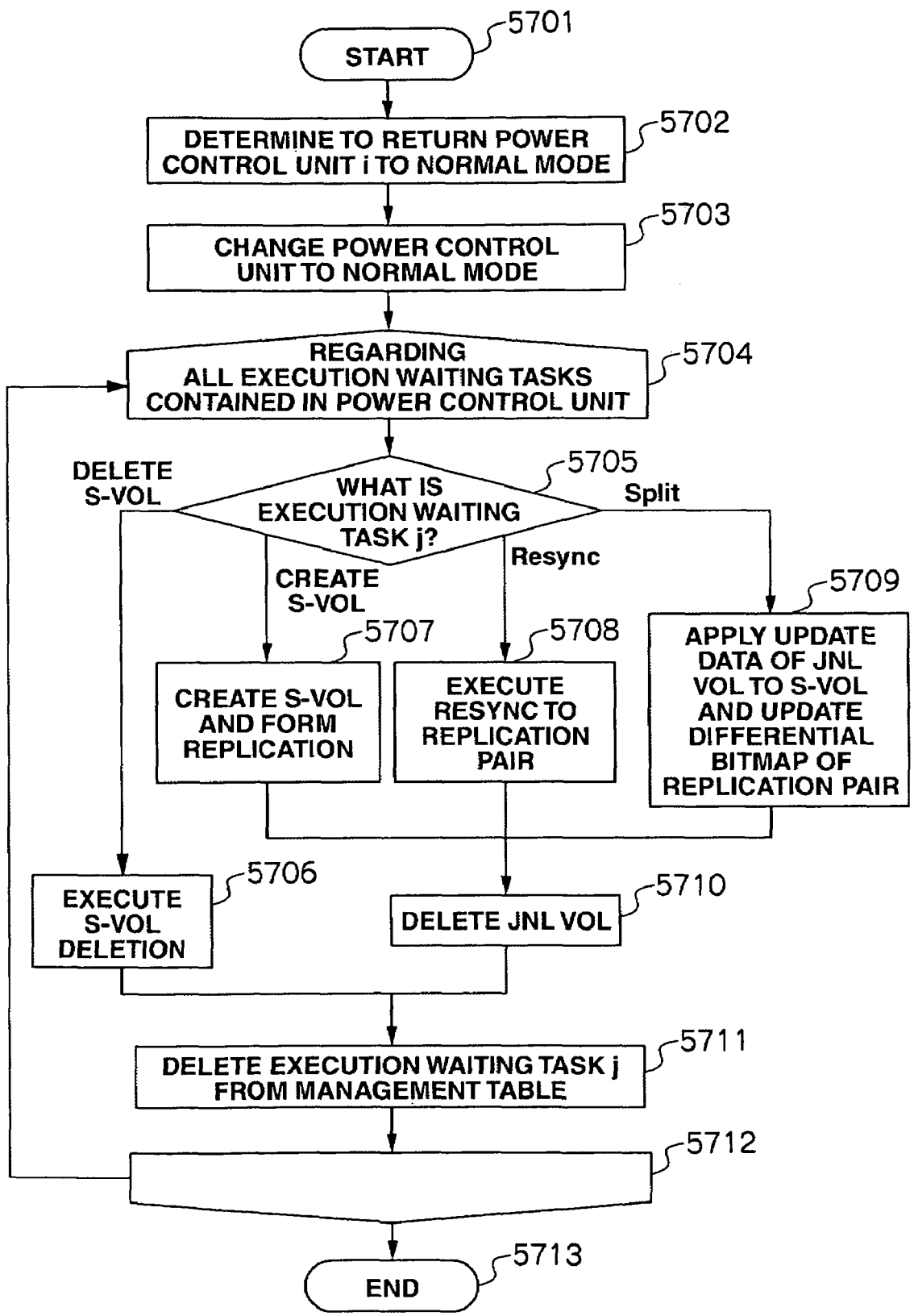
FIG. 18 is a flowchart for the power control unit to execute the execution waiting tasks after returning to a normal mode according to the second embodiment.

FIG. 18 is a flowchart showing the processing to be performed by the power control management PG 2025 for executing the execution waiting tasks after the power control unit is returned to the normal mode.

If the power control management PG 2025 determines to return the power control unit i to the normal mode (5701), it changes the target power control unit i to a normal mode (5703). In the following processing (5704 to 5712), the execution waiting task management TBL 2032 is referred to for performing the processing to return the power control unit i to the normal mode according to the task type.

Specifically, the power control management PG 2025 determines what the execution waiting task j is (5705) regarding all execution waiting tasks contained in the power control unit i (5704). Here, it is determined whether the task is S-VOL deletion, S-VOL creation, Resync, or Split.

If the task is determined to be S-VOL deletion, the power control management PG 2025 deletes the corresponding S-VOL in the power control unit, and cancels the replication pair setting (5706). If the task is determined to be S-VOL creation, the power control management PG 2025 creates a S-VOL in the power control unit, forms a replication pair (execution of replication formation) (5708), and deletes the unneeded JNL VOL 1521 (5710). If the task is determined to be Resync, the power control management PG 2025 executes Resync with the corresponding replication pair and, after becoming a pair status (5708), deletes the unneeded JNL VOL 1521 (5710). If the task is determined to be Split, the power control management PG 2025 applies update data (differential data) of the JNL VOL 1521 to the S-VOL, forms data at the point in time Split is executed, updates the differential bitmap of the S-VOL and the P-VOL with information from the point in time of Split (5709), and deletes the unneeded JNL VOL 1521 (5710).

The power control management PG 2025 thereafter deletes the completed processing from the execution waiting task management TBL 2032 (5711). Subsequently, the power control management PG 2025 determines whether the processing regarding all execution waiting tasks is complete (5712). If it is determined that the processing is not complete, the processing from 5704 is once again performed to the other execution waiting tasks that have not yet been processed. If it is determined that the processing is complete, the processing is ended.

According to the storage system of the second embodiment, efficient power consumption reduction can be realized while maintaining the power saving mode for a long period of time since the power saving mode is not be released promptly as a result of using the JNL VOL 1521.

The present invention can be broadly applied to storage systems and their power saving control methods.

What is claimed is:

1. A storage system including a storage apparatus system connected to a host via a communication path, comprising:
   one or more power control units stored in the storage apparatus system, each power control unit being configured to control power supply to constituent components of a respective physical volume of the storage apparatus system, the respective physical volumes of the one or more power control units being combined or partitioned to form a plurality of primary logical volumes and a plurality of secondary logical volumes;
   a power control module for switching each power control unit between a normal mode of performing normal power supply and a power saving mode of suppressing power consumption, the respective physical volume for each power control unit becoming unavailable upon the power control unit being switched to the power saving mode;
   a power control monitoring module for acquiring configuration information of each physical volume, the plurality of primary logical volumes, the plurality of secondary logical volumes, and the one or more power control units, and determining availability of each physical volume using the configuration information, the power control monitoring module determining the availability of a respective physical volume upon receiving a request for allocating a logical volume in a corresponding power control unit of the one or more power control units that is configured to control the power supply to the constituent components of the respective logical volume; and
   a replication control unit for replicating data from each primary logical volume to a corresponding secondary logical volume in a replication pair with the primary logical volume according to the availability determined for the respective physical volume from which the secondary logical volume is formed, each replication pair being set to either a pair status in which sequential replication of data is permitted or a suspend status in which sequential replication of data is suspended; and wherein the storage system includes a management interface connected to the storage apparatus system via a communication path and for performing a setting operation and a status display operation for the storage apparatus system, wherein the power control monitoring module outputs an indication of the availability determined for the respective physical volume from which the secondary logical volume is formed to the management interface, wherein the power control monitoring module, upon receiving a request for allocating a logical volume in a corresponding power control unit of the one or more power control units that is configured to control the power supply to the constituent components of a respective logical volume, determines the availability of the respective physical volume to be unavailable if the corresponding power control unit is switched to the power saving mode or if the respective physical volume does not form a primary logical volume that is being used by the host and a quantity of secondary logical volumes formed by the respective physical volume that are in a replication pair set to the pair status is less than or equal to a predetermined number.

2. A storage system including a storage apparatus system connected to a host via a communication path, comprising:

a plurality of power control units stored in the storage apparatus system, each power control unit being configured to control power supply to constituent components of a respective physical volume of the storage apparatus system, the respective physical volumes of the power control units being combined or partitioned to form a plurality of primary logical volumes and a plurality of secondary logical volumes;

a power control module for switching each power control unit between a normal mode of performing normal power supply, a power saving mode of suppressing power consumption, and a power saving wait mode in which a subsequent time of switching to the power saving mode is indicated, the respective physical volume for each power control unit becoming unavailable upon the power control unit being switched to the power saving mode;

a replication control unit for replicating data from each primary logical volume to a corresponding secondary logical volume in a replication pair with the primary logical volume according to the availability determined for the respective physical volume from which the secondary logical volume is formed, each replication pair being set to either a pair status in which sequential replication of data is permitted or a suspend status in which sequential replication of data is suspended;

a journal control unit for storing update information of data for each replication pair set to the suspend status as a journal in a respective journal volume; and a power control management module for acquiring configuration information of each physical volume, the plurality of primary logical volumes, the plurality of secondary logical volumes, and the power control units, identifying each secondary logical volume formed by the respective physical volume for each power control unit switched to the power saving wait mode of which the replication pair is set to the pair status, creating a respective journal volume for the replication pair of each identified secondary logical volume that is set to store update information of the replication pair in a different power control unit than the power control unit controlling power supply to the constituent components of the respective physical volume from which the identified secondary logical volume is formed, setting the replication pair of each identified secondary logical volume to a suspend status so that update information for the replication pair of the identified secondary logical volume is stored by the journal control unit in the respective journal volume created for the replication pair, and switching each power control unit switched to the power saving wait mode to the power saving mode.

3. The storage system according to claim 2, wherein, upon setting a replication pair to the suspend status, if an available journal volume does not exist in a different power control unit than the power control unit controlling power supply to the constituent components of the respective physical volume from which the secondary logical volume of the replication pair is formed, the power control management module creates a new journal volume in the different power control unit and stores update information of the replication pair therein.

4. The storage system according to claim 2, wherein the power control management module determines the availability of a respective physical volume upon receiving a request for allocating a logical volume in a corresponding power control unit of the plurality power control units that is configured to control the power supply to the constituent components of the respective logical volume, and wherein the power control management module determines the availability of the respective physical volume to be unavailable if the corresponding power control unit is switched to the power saving mode or if the respective physical volume does not form a primary logical volume that is being used by the host and a quantity of secondary logical volumes formed by the respective physical volume that are in a replication pair set to the pair status is less than or equal to a predetermined number.

5. The storage system according to claim 2, wherein the storage system includes a management interface connected to the storage apparatus system via a communication path and for performing a setting operation and a status display operation for the storage apparatus system; and wherein the power control management module retains the configuration and status of each replication pair and each respective journal volume as management information and, when the setting is configured to store update information in a respective journal volume, outputs to the management interface that the replication pair corresponding to the respective journal volume is set to the pair status.

6. The storage system according to claim 5, wherein, upon a request for changing a replication pair from the pair status to the suspend status being issued from the management interface, the power control management module identifies the respective journal volume for the replication pair based on the management information of the configuration and status of the replication pair and the respective journal volume, and initiates storage of update information in the journal volume.

7. The storage system according to claim 5, wherein, upon a request for deleting a secondary logical volume being issued from the management interface, the power control management module retains the request as history, changes the power control unit that controls power supply to the respective physical volume from which the secondary logical volume is formed to the normal mode if the power control unit is set to the power saving mode, and thereafter deletes the secondary logical volume.

8. The storage system according to claim 2, wherein upon switching a power control unit from the power saving mode to the normal mode, the power control management module changes each replication pair of each secondary logical volume formed by the respective physical volume for the power control unit that is set to the suspend status to the pair status and deletes the respective journal volume or the update information stored in the respective journal volume for each replication pair changed.

9. A storage system including a storage apparatus system connected to a host via a communication path, and a management interface connected to the storage apparatus system via a communication path and for performing a setting operation of the storage apparatus system, comprising:
- a plurality of power control units stored in the storage apparatus system, each power control unit being configured to control power supply to constituent components of a respective physical volume of the storage apparatus system, the respective physical volumes of the power control units being combined or partitioned to form a plurality of primary logical volumes and a plurality of secondary logical volumes;
- a power control module for switching each power control unit between a normal mode of performing normal power supply, a power saving mode of suppressing power consumption, and a power saving wait mode in which a subsequent time of switching to the power saving mode is indicated, the respective physical volume for each power control unit becoming unavailable upon the power control unit being switched to the power saving mode;
- a replication control unit for replicating data from each primary logical volume to a corresponding secondary logical volume in a replication pair with the primary logical volume according to the availability determined for the respective physical volume from which the secondary logical volume is formed, each replication pair being set to either a pair status in which sequential replication of data is permitted or a suspend status in which sequential replication of data is suspended;
- a journal control unit for storing update information of data for each replication pair set to the suspend status as a journal in a respective journal volume; and
- a power control management module for acquiring configuration information of each physical volume, the plurality of primary logical volumes, the plurality of secondary logical volumes, and the power control units, identifying each secondary logical volume formed by the respective physical volume for each power control unit switched to the power saving wait mode of which the replication pair is set to the pair status, creating a respective journal volume for the replication pair of each identified secondary logical volume that is set to store update information of the replication pair in a different power control unit than the power control unit controlling power supply to the constituent components of the respective physical volume from which the identified secondary logical volume is formed, setting the replication pair of each identified secondary logical volume to a suspend status so that update information for the replication pair of the identified secondary logical volume is stored by the journal control unit in the respective journal volume created for the replication pair, and switching each power control unit switched to the power saving wait mode to the power saving mode, and
- wherein the power control management module, upon a request for changing a replication pair from the suspend status to the pair status being issued from the management interface in a configuration where the replication pair is configured from a primary logical volume formed by the respective physical volume for a first power control unit set to the normal mode and a secondary logical volume formed by the respective physical volume for a second power control unit set to the power saving mode, so that update information for the replication pair is stored in a respective journal volume formed by the respective physical volume for the first power control unit or a third power control unit set to the normal mode.

10. The storage system according to claim 9, wherein the power control management module sets a first logical volume formed by the respective physical volume for the first power control unit to the normal mode as a primary logical volume, allocates a new secondary logical volume formed by the respective physical volume for the second power control unit set to the power saving mode, and, upon a request for creating a replication pair between the first logical volume and the new secondary logical volume issued from the management interface, configures a setting so that update information of the first logical volume is stored in a respective journal volume formed by the respective physical volume for the first power control unit or a third power control unit set to the normal mode.

11. The storage system according to claim 10, wherein, upon changing the second power control unit from the power saving mode to the normal mode, the power control management module allocates the new secondary logical volume formed by the respective physical volume for the second power control unit to create the replication pair between the first logical volume and the new secondary logical volume, and deletes the respective journal volume or the corresponding update information stored in the respective journal volume for the replication pair.

12. The storage system according to claim 9, wherein, if an available journal volume is not formed by the respective physical volume for the first power control unit or the third power control unit upon configuring a setting so that update information of the first logical volume is stored in the respective journal volume formed by the respective physical volume for the first power control unit or the third power control unit, the power control management module creates a new journal volume and stores the update information of the replication in the new journal volume.

13. The storage system according to claim 9, wherein the power control management module retains the configuration and status of each replication pair and each respective journal volume as management information and, when the setting is configured to store update information in a respective journal volume, outputs to the management interface that the replication pair corresponding to the respective journal volume is set to the pair status.

14. The storage system according to claim 9, wherein, upon a request for changing a replication pair from the pair status to the suspend status being issued from the management interface, the power control management module identifies the respective journal volume for the replication pair based on the management information of the configuration and status of the replication pair and the respective journal volume, and initiates storage of update information in the journal volume.

15. The storage system according to claim 14, wherein, upon switching a power control unit from the power saving mode to the normal mode, the power control management module applies the update information stored in the respective journal volume for each replication pair to the secondary logical volume of the replication pair and deletes the respective journal volume or the update information stored in the respective journal volume for each replication pair changed.

16. The storage system according to claim 9, wherein the power control management module sets as a first criterion that a data amount of update information stored in a respective journal volume for a replication pair exceeds a constant value, sets as a second criterion that a data amount per unit time stored in the respective journal volume for the replication pair exceeds a constant value, and determines whether to change the second power control unit from the power saving mode to the normal mode by using one or both of the first and the second criteria.

17. The storage system according to claim 9, wherein upon switching a power control unit from the power saving mode to the normal mode, the power control management module changes each replication pair of each secondary logical volume formed by the respective physical volume for the power control unit that is set to the suspend status to the pair status and deletes the respective journal volume or the update information stored in the respective journal volume for each replication pair changed.

* * * * *